May 22, 1928.  
J. J. DAVIDSON  
TRANSMISSION GEAR  
Filed May 17, 1926
1,670,403
3 Sheets-Sheet 3
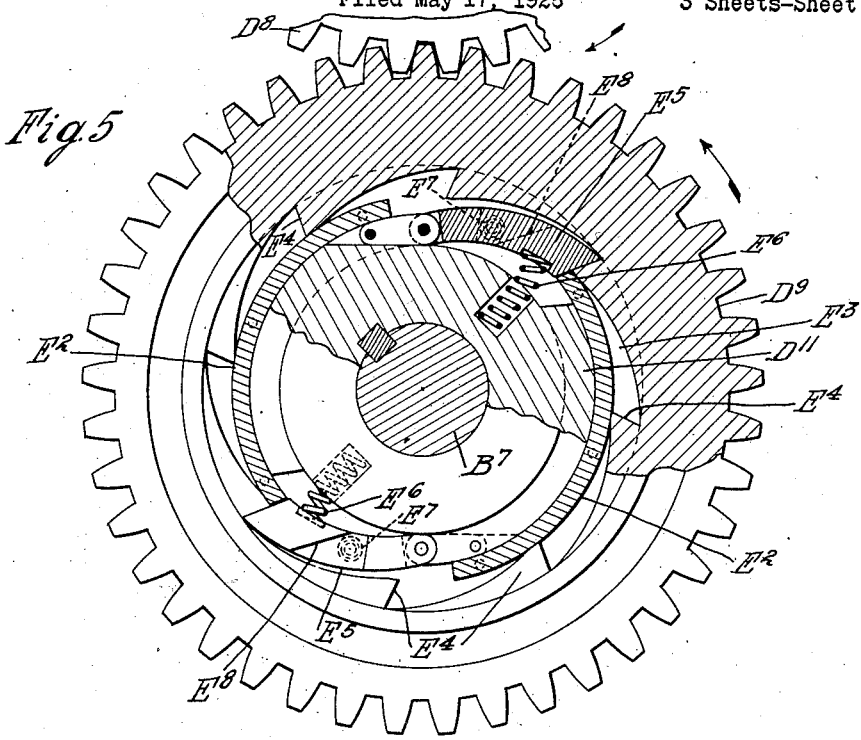
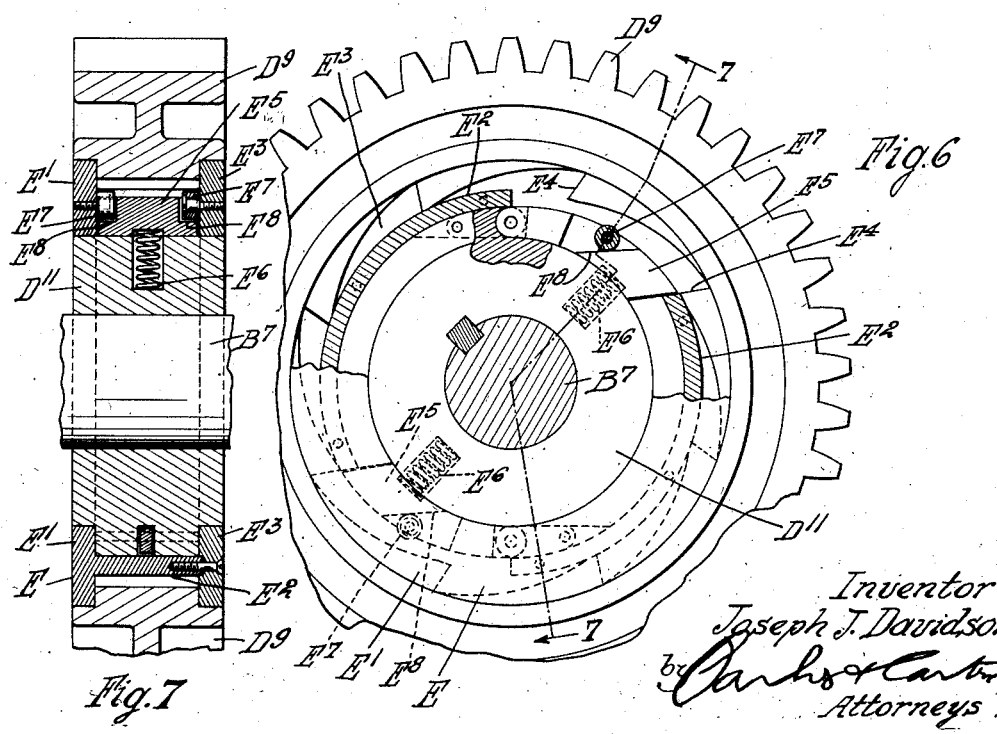
Inventor  
Joseph J. Davidson  
by Carter & Carter  
Attorneys Patented May 22, 1928.

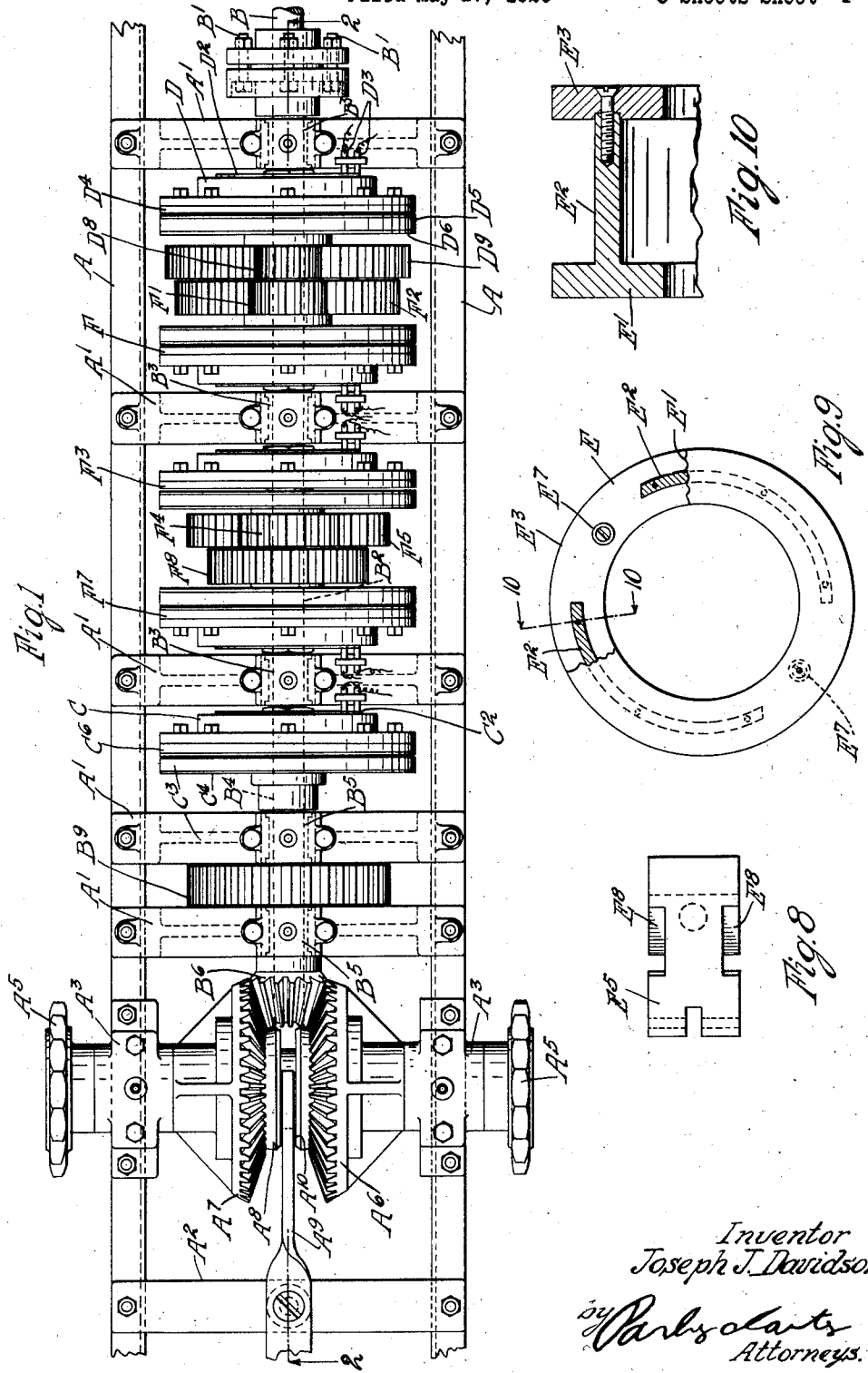

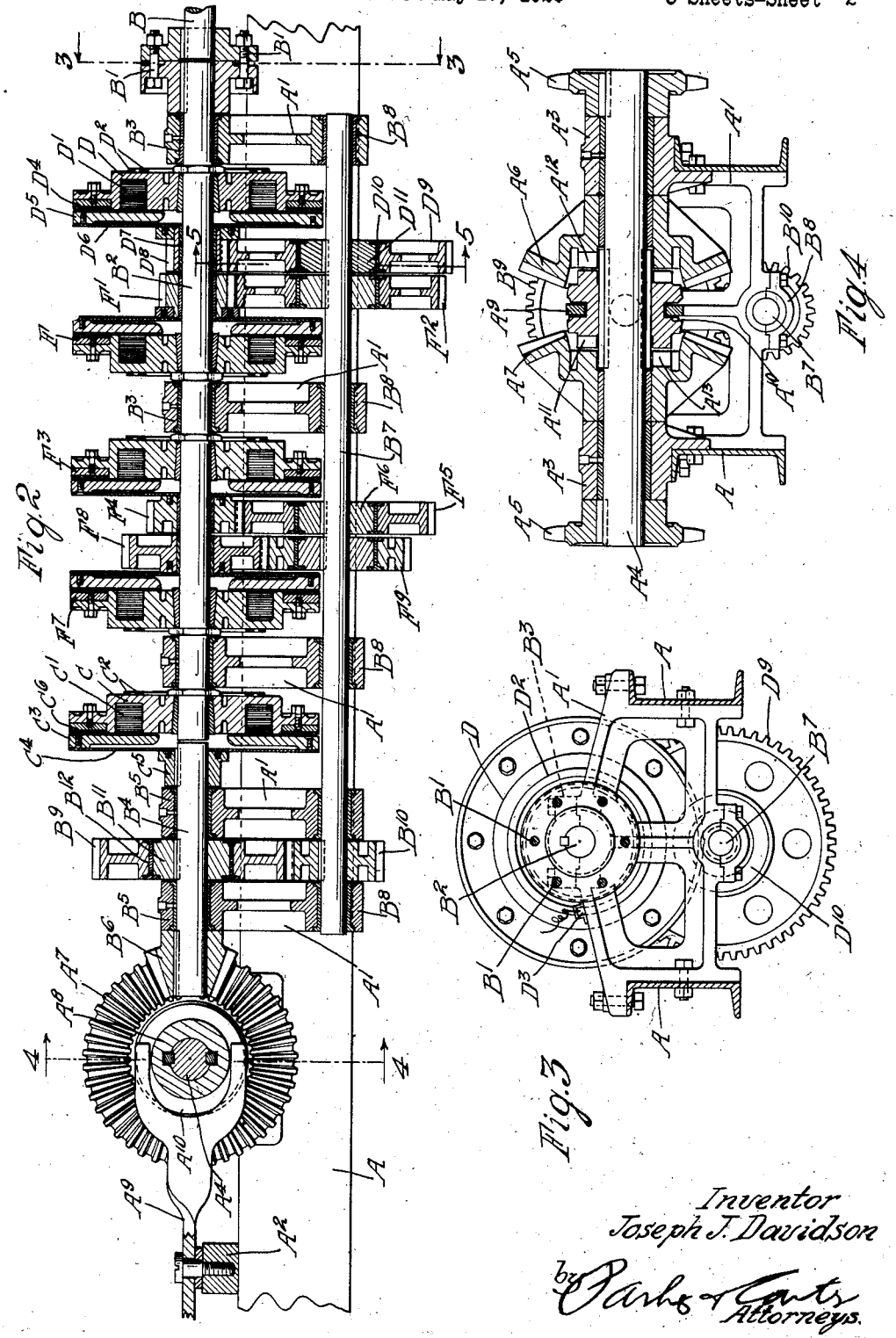

1,670,403

UNITED STATES PATENT OFFICE.

JOSEPH J. DAVIDSON, OF DULUTH, MINNESOTA.

TRANSMISSION GEAR.

Application filed May 17, 1926. Serial No. 109,488.

My invention relates to improvements in transmission gears for changing the speed ratio between the engine and a driven member and is particularly applicable for use in connection with heavy machinery such as rail cars, locomotives, caterpillar tractors and the like where speeds are comparatively low and the weights moved are great. It has for one object to provide a transmission wherein the lower speed is always in mesh until the instant that the higher speed goes into operation so that there is no pause between gear shifts and so that the drive is continuous throughout the entire length of speed change. Another object is to provide the transmission wherein the throwing into gear of a higher speed automatically disengages the gear of the lower speed. Other objects will appear from time to time throughout the specification and claims.

My invention is illustrated more or less diagrammatically in the accompanying drawings, wherein—

Figure 1 is a plan view of the transmission;

Figure 2 is a section along the line 2—2 of Figure 1;

Figure 3 is a section along the line 3—3 of Figure 2;

Figure 4 is a section along the line 4—4 of Figure 2;

Figure 5 is a section on an enlarged scale along the line 5—5 of Figure 2;

Figure 6 is a similar section showing parts in different position;

Figure 7 is a section along the line 7—7 of Figure 6;

Figure 8 is a plan view of the clutch dog;

Figure 9 is a plan view of a clutch ring;

Figure 10 is a section along the line 10—10 of Figure 9.

Like parts are indicated by like characters throughout the specification and drawings.

A A are the longitudinal and $A^1$ $A^1$ are the cross members of the transmission frame. $A^2$ is a tight fulcrum member forming a part of the frame. $A^3$ $A^3$ are bearings mounted on the frame and carrying the jack shaft $A^4$ which has at either end the drive sprockets $A^5$. Rotatably mounted on the shaft $A^4$ are the miter gears $A^6$, $A^7$ for forward and reverse. $A^8$ is a clutch splined on the shaft $A^4$ adapted to be moved selectively into or out of engagement with one or the other of the gears $A^6$ $A^7$ by means of the forked control lever $A^9$ pivoted on the member $A^2$. The clutch $A^8$ is slotted at $A^{10}$ to engage the forked lever $A^9$ and is provided at either side with teeth $A^{11}$ adapted to mesh selectively with teeth $A^{12}$ in the gear $A^6$ and teeth $A^{13}$ in the gear $A^7$, the distance between the teeth being such that the clutch may be in neutral as indicated in Figure 4 or may be moved to the right or left through reverse or forward as the case may be.

B is a drive shaft adapted to be driven by any suitable source of power such as an engine. $B^1$ is a flexible coupling connecting the drive shaft with the transmission shaft $B^2$ which shaft is mounted for rotation in bearings $B^3$ on the cross members $A^1$. In line with the transmission shaft $B^2$ is a direct drive shaft $B^4$ mounted in bearings $B^5$ on two of the cross members $A^1$. This shaft is out of contact with the shaft $B^2$ and ends in a miter pinion $B^6$ in mesh at all times with the miter gears $A^6$ and $A^7$. $B^7$ is an idler shaft mounted for rotation in bearings $B^8$ on the lower parts of the cross members $A^1$. $B^9$ is a gear keyed on the direct drive shaft $B^4$ in mesh with a pinion $B^{10}$ keyed on the idler shaft $B^7$. The gear $B^9$ comprises an outer ring and a central hub portion $B^{11}$ with a ratchet mechanism $B^{12}$ which will be later described in connection with other parts of the apparatus. This ratchet mechanism is interposed between them so that when the gear $B^9$ is driven by the gear $B^{10}$ the shaft $B^4$ is rotated but when the shaft $B^4$ is rotated by means other than the gear $B^9$, the gear $B^9$ stands still while the hub $B^{11}$ rotates, and thus the shaft $B^7$ may remain at rest.

For direct drive of the shaft $B^4$ from the shaft $B^2$ there is mounted on the end of the shaft $B^2$ a clutch drum C containing an electromagnetic coil $C^1$ adapted to be excited by electirc current through the slip rings $C^2$ from any suitable source of electric power. When this excites the clutch the armature ring $C^3$ mounted on the spring driving disc $C^4$ on the hub $C^5$ on the end of the shaft $B^4$ is drawn against the driving face $C^6$ and the electromagnetic clutch in the usual manner takes the drive giving a direct drive between the shafts $B^2$ and $B^4$. When the magnetic coil is not excited the spring disc $C^4$ draws the ring $C^3$ away from the driving face $C^6$ so that the two members may rotate independently.

Rigidly mounted on the shaft $B^2$ adjacent its outer end is a similar electromagnetic clutch drum D having coils $D^1$ excited by electric current supplied through the slip rings $D^2$ and brushes $D^3$. This clutch has a driving face $D^4$ in opposition to a driven ring $D^5$ on a spring spider $D^6$ mounted on the hub $D^7$ rotatable on the shaft $B^2$. When the members $D^4$ and $D^5$ are drawn together, the shaft $B^2$ drives the hub $D^7$ which hub carries a pinion $D^8$ in mesh with a ring gear $D^9$. This ring gear $D^9$ by means of the ratchet mechanism indicated in part at $D^{10}$ drives the hub $D^{11}$ keyed to the shaft $B^7$ and this drives the pinion $B^{10}$, $B^9$, hub $B^{11}$ and the shaft $B^4$. Since the pinion $D^8$ is very small this gives the first or last speed or drive.

Referring now to Figures 5 to 10 inclusive, it will be noted that the ring gear $D^9$ is free to rotate on the cage E. This cage is made up of a flange $E^1$, a segmental drum $E^2$ and a removable flange $E^3$, and is mounted to travel on the hub $D^{11}$. The two drum segments $E^2$ are discontinuous and are in sliding engagement with a plurality of ratchet teeth $E^4$ on the inside of the ring gear $D^9$. $E^5$ $E^5$ are dogs pivoted in the hub $D^{11}$ and adapted each to work in the space between the abutting ends of the drum segments $E^2$, being forced outwardly into engagement with the ratchet teeth by the spring $E^6$, the hub being cut away so that the dogs may be withdrawn inside the outer periphery of the drum segments $E^2$, that is, so that they may be moved from the position in Figure 5 where they engage to the position shown in Figure 6 where they do not. This withdrawal of the dogs may be caused by the rollers $E^7$ on the inner sides of the flanges $E^1$ $E^2$, these rollers engaging cam surfaces $E^8$ on the dogs $E^5$. In Figure 5, the parts are shown in the driving position. If, however, by means subsequently discussed the speed of rotation of the shaft $B^7$ is increased sufficiently, the dogs will run away from the ratchet teeth from the position shown in Figure 5 to the position shown in Figure 6 until they catch up with the rollers $E^7$. These rollers will then ride up on the cam surfaces $E^8$ compress the springs $E^6$ and force the dogs into the position shown in Figure 6 thus breaking the drive. If at some later time the speed of the shaft $B^2$ drops a reverse motion will take place, the dogs will be released and will engage the ratchet teeth.

Assuming that the parts are in the position shown in Figure 5, for the low speed gear and the pinion $D^8$ is driving if we now excite the electro-magnetic clutch F, the shaft $B^2$ will then drive the pinion $F^1$. This pinion being larger than the pinion $D^8$ will cause the shaft $B^7$ to travel at a faster rate of speed. The shaft $B^7$ will then cause the hub $D^{11}$ to run away from the ring gear $D^9$ and the parts will assume the position shown in Figure 6 and drive at a relatively higher speed is permitted from the shaft $B^2$ through clutch F, pinion $F^1$ ring gear $F^2$ to the shaft $B^7$. As soon as this drive is established the current can be turned off, the clutch D and the member $D^5$ $D^6$ hub $D^7$ pinion $D^8$ and ring gear $D^9$ will remain at rest while the hub $D^{11}$ continues to rotate. For the next speed change the magnetic clutch $F^3$ may be excited, then the drive is through the pinion $F^4$, ring gear $F^5$ and hub $F^6$ to the shaft $B^7$. The next speed change will be caused by exciting the clutch $F^7$ when the drive is through the pinion $F^8$ gear $F^9$ to the shaft $B^7$. The next change to direct drive will be caused by exciting the clutch C. The speeds can be dropped back to any intermediate speed or to a lower speed by merely reversing the process. In each case during the time that the dogs are in engagement for the lower speed drive, the shaft merely runs away at such a rate of speed that the dogs do not work and they are left behind one after another. The load is always picked up from a lower speed and accelerated to a higher speed or dropped back from a higher speed to a lower speed without ever discontinuing the low speed drive until the high speed has taken more or without ever allowing the low speed drive to take off until the high speed has let go. The drive is thus always continuous. Any number of speed combinations can be had merely by increasing the number of clutches and changing the relation between the drive for each successive clutch. The speed control is electrical without any mechanical control whatever because all that is necessary is to excite successive clutches and the means for doing this, that is the electric controller to distribute the current to successive electromagnetic clutches is not here shown as they form no part of my present invention.

It will be evident that while I have shown in my drawings an operative device, still many changes might be made in the size, shape, number and arrangement of parts without departing materially from the spirit of my invention and I wish therefore that my showing be taken as in a sense diagrammatic.

I claim:

1. In a transmission gear, a drive shaft and a driven shaft arranged in line one with the other, an electromagnetic clutch interposed between them, a jack shaft extending alongside of both of them, a gear connection between one end of the jack shaft and the driven shaft, an over-running clutch associated with the gear a plurality of gear trains interposed between the driving shaft and the jack shaft, separate electromagnetic clutches associated with each gear train, and an over-running clutch associated with each gear train.

2. In a transmission gear, a driving and a driven shaft arranged in line a clutch interposed between them, a jack shaft and a gear train including an over-running clutch interposed between the jack shaft and the driven shaft, a plurality of gear trains of different ratio interposed between the driving and jack shafts, including over-running clutches and control clutches one of each with each gear train.

3. In a transmission gear a driving and a driven shaft, a jack shaft associated with them, a control clutch interposed between the driving and the driven shafts, a gear train including an over-running clutch interposed between the driven and the jack shafts, a plurality of gear trains interposed between the driving and the jack shafts for different ratios, there being associated with some of the gear trains over-running and control clutches.

Signed at Duluth, county of Saint Louis, and State of Minnesota, this 29th day of April, 1926.

JOSEPH J. DAVIDSON.